US009792186B2

(12) United States Patent
Yu

(10) Patent No.: US 9,792,186 B2
(45) Date of Patent: Oct. 17, 2017

(54) KERNEL STATE AND USER STATE DATA EXCHANGE METHOD FOR DISASTER RECOVERY OF VIRTUAL CONTAINER SYSTEM

(71) Applicant: Tsinghua University, Beijing (CN)

(72) Inventor: Hongliang Yu, Beijing (CN)

(73) Assignee: Tsinghua University, Beijing (CN)

( * ) Notice: Subject to any disclaimer, the term of this patent is extended or adjusted under 35 U.S.C. 154(b) by 134 days.

(21) Appl. No.: 14/717,926

(22) Filed: May 20, 2015

(65) Prior Publication Data
US 2016/0132410 A1    May 12, 2016

(30) Foreign Application Priority Data
Nov. 7, 2014    (CN) .......................... 2014 1 0643995

(51) Int. Cl.
*G06F 11/00* (2006.01)
*G06F 11/14* (2006.01)

(52) U.S. Cl.
CPC .... *G06F 11/1469* (2013.01); *G06F 2201/815* (2013.01)

(58) Field of Classification Search
CPC ....................... G06F 11/1469; G06F 2201/815
USPC .......................................................... 714/15
See application file for complete search history.

(56) References Cited

U.S. PATENT DOCUMENTS

| | | | | |
|---|---|---|---|---|
| 6,636,941 B1 * | 10/2003 | Gold | .................. | G06F 11/1441 711/111 |
| 7,523,343 B2 * | 4/2009 | Leis | .................. | G06F 11/0727 714/5.11 |
| 9,058,326 B1 * | 6/2015 | Hamel | .............. | G06F 17/30008 |
| 2010/0077160 A1 * | 3/2010 | Liu | ........................ | G06F 3/0482 711/162 |
| 2010/0115332 A1 * | 5/2010 | Zheng | ................. | G06F 11/1461 714/6.2 |
| 2012/0324280 A1 * | 12/2012 | Wang | .................. | G06F 11/1417 714/15 |
| 2015/0143064 A1 * | 5/2015 | Bhargava | ............ | G06F 11/1451 711/162 |

* cited by examiner

*Primary Examiner* — Yair Leibovich
(74) *Attorney, Agent, or Firm* — Seed IP Law Group LLP

(57) ABSTRACT

The present invention relates to a kernel state and user state data exchange method for disaster recovery of a virtual container system. In one disaster recovery backup of a virtual container, data needs to be exchanged between a kernel state and a user state. The file system operation of the kernel state needs to be transmitted to a user state program for processing firstly, and the processing result is returned to the kernel state and then transmitted to an original application program. Low recovery speed of a data block is mainly caused by the need of multiple times of switching between the kernel state and the user state, and the communication efficiency of the kernel state and the user state is low. In the present invention, all recovery operations are completed by the user state by virtue of a FUSE. A FUSE file system is realized firstly, one of files therein is mapped to the /DEV/ LOOP device, then the LOOP device is used as a shadow device of a disk to be recovered, and a virtual container manager enables a virtual container with the LOOP device. The access to the original hard disk is intercepted in the FUSE file system, and then the FUSE file system communicates with the server, so that efficient on-demand recovery of data is realized.

8 Claims, 2 Drawing Sheets

US 9,792,186 B2

KERNEL STATE AND USER STATE DATA EXCHANGE METHOD FOR DISASTER RECOVERY OF VIRTUAL CONTAINER SYSTEM

CROSS-REFERENCE TO RELATED APPLICATIONS

This application claims priority to Chinese Application No. CN201410643995.3, filed Nov. 7, 2014, which is incorporated by reference in its entirety.

TECHNICAL FIELD

The present invention relates to the field of computer operating systems and network storage, and in particular relates to a kernel state and user state data exchange method for disaster recovery of a virtual container system.

BACKGROUND

With the development of technology, the vulnerability of data in face of disasters is increasingly prominent in the field of Internet, and the loss of data always brings great economic loss, therefore the requirement for data security is increasingly high. The technology adopted for resisting the disasters is called as a disaster recovery backup technology, and the huge loss caused by irreversible data loss due to disasters like "911" event may be effectively prevented in the presence of the disaster recovery backup technology.

A disaster recovery backup system includes a disaster recovered system and a disaster recovery computer, wherein the disaster recovered system transmits disaster recovery data to the disaster recovery computer through a network during normal operation and acquires all data required for recovery from the disaster recovery computer after a disaster happens.

In the traditional disaster recovery backup technology, data stored in a computer is generally copied to a remote disaster recovery center connected through a network in a remote backup manner, and the lost data is reacquired from the remote disaster recovery center when a disaster happens, so that the purpose of reducing the disaster loss is achieved. With the development of virtualization technology, a novel disaster recovery technology capable of backing up the whole running environment including data appears. The disaster recovery backup technology based on the virtualization technology has the following characteristics: the running state of the disaster recovered system may be completely recovered, including running state such as buffer contents which are not written into a disk and the like; and the disaster recovery process is transparent to applications in the disaster recovered system, and no modification has to be made to programs.

Virtual container based disaster recovery is a form of virtualized disaster recovery; and according to the existing experiments and analysis, the recovery efficiency of a data block is mainly affected by the need of multiple times of switching between a kernel state and a user state, and the communication efficiency of the kernel state and the user state is not high enough.

SUMMARY

The present invention provides a kernel state and user state data exchange method for disaster recovery of a virtual container system, in order to solve the key problem of improving the data recovery performance of virtual container disaster recovery.

For such a purpose, the present invention provides a kernel state and user state data exchange method for disaster recovery of a virtual container system, including the following specific steps:

S1: establishing, by a virtual device mapping module, a FUSE user state file system, wherein the virtual device mapping module is included in a client to be recovered;

S2: mapping a file in the FUSE user state file system to a DEV LOOP pseudo-device, wherein the DEV LOOP device is used as a shadow device of a disk to be recovered according to a preset recovery mode;

S3: maintaining, by a missing page detecting module, a recovery data bitmap, and recording the number of a data block which has been recovered and/or does not need to be recovered due to new write-in, wherein the missing page detecting module is included in the client to be recovered;

S4: maintaining, by an available page maintaining module, an available data bitmap based on the above operation, and recording information of an idle page interval, wherein the available page maintaining module is included in the client to be recovered; and S5: performing, by a data transmission module, transmission exchange of final information data, wherein the data transmission module is included in the client to be recovered.

Further, the missing page detecting module is further configured to monitor whether a recovered data page exists.

Specifically, the preset recovery mode includes an on-demand recovery mode and an aggressive recovery mode;
wherein the on-demand recovery mode indicates that a system to be recovered runs through a virtual container under the condition that data is not in position and initiates a data recovery request as required for the data needed in running of the virtual container; and the aggressive recovery mode indicates that an unused data block also pre-fetches data beforehand in the running process of the system to be recovered.

Further, step S2 specifically includes:
step S21: mapping the file of the FUSE file system as /DEV/LOOP0; and
step S22: using, by the virtual container system, the above device as /DEV/SDA, and intercepting, by a FUSE, all read and write operations on the /DEV/LOOP0.

Further, the client to be recovered recovers data through the on-demand recovery mode: for a read operation, if the data is in a position indicated by the recovery data bitmap, judging that the data has been recovered, and directly reading the data block contents from the SDA; if the data is in the available data bitmap, judging that no data block is used, and returning random contents to recover the data; and if the above two conditions are not involved, requesting a server for the data block, waiting for a data reply, writing the received data block contents to the corresponding position of the SDA, updating the recovery data bitmap, and returning the data block contents Further, the data write flow of aggressive recovery implemented through the aggressive recovery mode, at the backup server, includes: for a write operation, enabling a background thread, scanning all data blocks, judging that the data block is a non-idle data block and is not in the recovery data bitmap, and pushing the data to the client; and for an idle block interval, sending an idle notification message to the client, wherein the number of the pushed data block and the processed idle notification message are recorded in the recovery data bitmap.

Further, the data write flow of aggressive recovery implemented through the aggressive recovery mode, at the client to be recovered, includes: enabling a background thread, receiving the data block pushed by the server, and checking whether the data block is in the recovery data bitmap of the client; if the data block is in the recovery data bitmap, judging that the data has been recovered as required or data write modification occurs, and ignoring; if the data block is not in the recovery data bitmap, writing the data block to the corresponding position of the SDA, and updating the bitmap; and if the idle notification message is received, recording the idle notification message in an idle data bitmap.

Further, the method further includes a leak finding process, wherein after the aggressive recovery is completed, the client checks the data recovery bitmap and the idle data bitmap, requests the server to recover the data if a non-recovered data block is found, and modifies the corresponding bitmap.

The present invention discloses the kernel state and user state data exchange method for disaster recovery of a virtual container system, wherein in one disaster recovery backup of a virtual container, data needs to be exchanged between a kernel state and a user state. The file system operation of the kernel state needs to be transmitted to a user state program for processing firstly, the processing result is returned to the kernel state and then transmitted to an original application program. In this process, low recovery speed of a data block is mainly caused by the need of multiple times of switching between the kernel state and the user state, and the communication efficiency of the kernel state and the user state is low. In the present invention, all recovery operations are completed by the user state by virtue of the FUSE. A FUSE file system is realized firstly, one of files therein is mapped to the /DEV/LOOP device, then the LOOP device is used as a shadow device of a disk (e.g. SDA) to be recovered, and a virtual container manager enables a virtual container with the LOOP device. The access to the original hard disk is intercepted in the FUSE file system, and then the FUSE file system communicates with the server, so that efficient on-demand recovery of data is realized.

BRIEF DESCRIPTION OF THE DRAWINGS

The features and advantages of the present invention will be understood more clearly with reference to the accompanying drawings, and the accompanying drawings are schematic and should not be understood in limiting the present invention, in which.

DETAILED DESCRIPTION OF THE PREFERRED EMBODIMENTS

The present invention relates to the field of computer operating systems and network storage, and in particular relates to a kernel state and user state data exchange method for disaster recovery of a virtual container system. Wherein the recovery technology is significant for a disaster recovery storage system and may ensure accurate and quick recovery of massive data and reduce loss. The virtual container disaster recovery involved in the present invention is an important branch of the disaster recovery technology and is significant in practical application.

The present invention will be described in detail below in combination with specific embodiments, but the protection scope of the present invention is not limited to the specific scope of the embodiments. All of other embodiments, obtained on the basis of the embodiments in the present invention by those of ordinary skill in the art without any creative effort, shall fall into the protection scope of the present invention.

Figure 1:
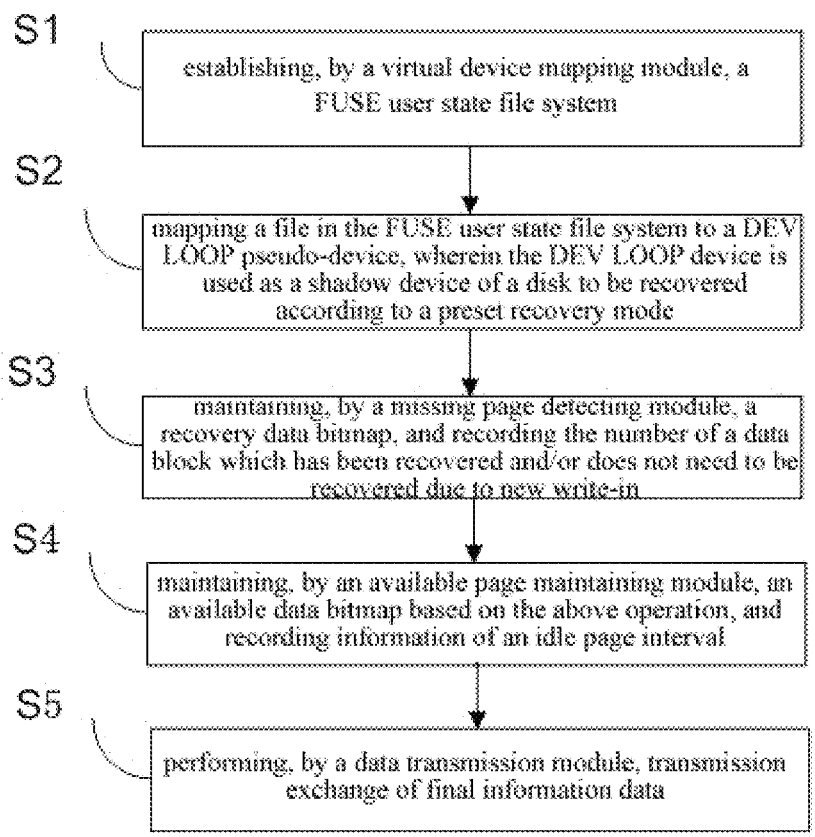
FIG. 1 shows a step flow diagram of a kernel state and user state data exchange method for disaster recovery of a virtual container system in an embodiment of the present invention.

The embodiments of the present invention will be described in detail below in combination with FIG. 1.

A kernel state and user state data exchange method for disaster recovery of a virtual container system, includes the following specific steps:

step S1: establishing, by a virtual device mapping module, a FUSE user state file system, wherein the virtual device mapping module is included in a client to be recovered;

step S2: mapping a file in the FUSE user state file system to a DEV LOOP pseudo-device, wherein the DEV LOOP device is used as a shadow device of a disk to be recovered according to a preset recovery mode;

in particular, wherein step S2 specifically includes: step S21: mapping the file of the FUSE file system as /DEV/LOOP0; step S22: using, by the virtual container system, the above device as /DEV/SDA, and intercepting, by a FUSE, all read and write operations on the /DEV/LOOP0;

step S3: maintaining, by a missing page detecting module, a recovery data bitmap, and recording the number of a data block which has been recovered and/or does not need to be recovered due to new write-in, wherein the missing page detecting module is included in the client to be recovered;

step S4: maintaining, by an available page maintaining module, an available data bitmap based on the above operation, and recording information of an idle page interval, wherein the available page maintaining module is included in the client to be recovered; and step S5: performing, by a data transmission module, transmission exchange of final information data, wherein the data transmission module is included in the client to be recovered.

Further, the missing page detecting module is further configured to monitor whether a recovered data page exists.

Further, the preset recovery mode includes an on-demand recovery mode and an aggressive recovery mode. Wherein the on-demand recovery mode indicates that a system to be recovered runs through a virtual container under the condition that data is not in position and initiates a data recovery request as required for the data needed in running of the virtual container; and the aggressive recovery mode indicates that an unused data block also pre-fetches advanced data in the running process of the system to be recovered, so that the recovery speed of the whole system is improved.

Specifically, the client to be recovered recovers data through the on-demand recovery mode: for a read operation, if the data is in a position indicated by the recovery data bitmap, judging that the data has been recovered, and directly reading the data block contents from the SDA; if the data is in the available data bitmap, judging that no data block is used, and returning random contents to recover the data; and if the above two conditions are not involved, requesting a server for the data block, waiting for a data reply, writing the received data block contents to the corresponding position of the SDA, updating the recovery data bitmap, and returning the data block contents.

Further, the data write flow of aggressive recovery implemented through the aggressive recovery mode, at the backup server, includes: for a write operation, enabling a background thread, scanning all data blocks, judging that the data block is a non-idle data block and is not in the recovery data bitmap, and pushing the data to the client; and for an idle block interval, sending an idle notification message to the client, wherein the number of the pushed data block and the processed idle notification message are recorded in the recovery data bitmap.

Further, the data write flow of aggressive recovery implemented through the aggressive recovery mode, at the client to be recovered, includes: enabling a background thread, receiving the data block pushed by the server, and checking whether the data block is in the recovery data bitmap of the client; if the data block is in the recovery data bitmap, judging that the data has been recovered as required or data write modification occurs, and ignoring; if the data block is not in the recovery data bitmap, writing the data block to the corresponding position of the SDA, and updating the bitmap; and if the idle notification message is received, recording the idle notification message in an idle data bitmap.

Still further, the data write flow further includes a leak finding process, wherein after the aggressive recovery is completed, the client checks the data recovery bitmap and the idle data bitmap, requests the server to recover the data if a non-recovered data block is found, and modifies the corresponding bitmap.

Figure 2:
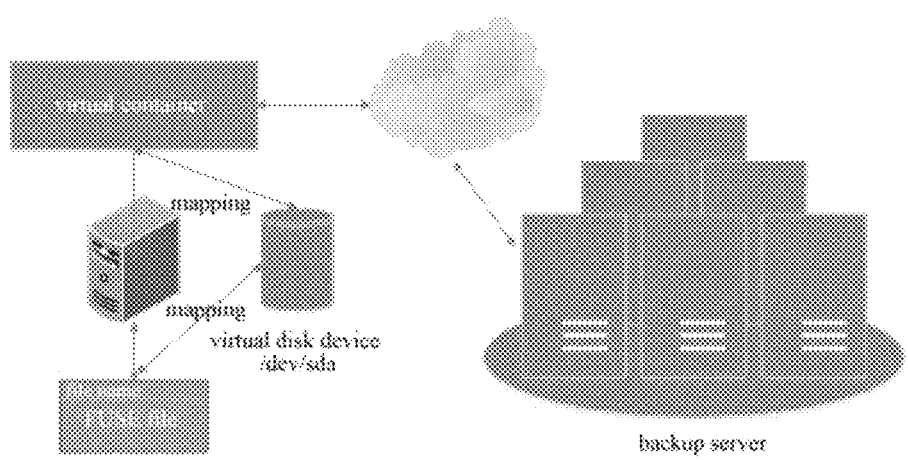
FIG. 2 shows a schematic diagram of a system running in the kernel state and user state data exchange method for disaster recovery of a virtual container system in an embodiment of the present invention.

The application structure of the kernel state and user state data exchange method for disaster recovery of a virtual container system provided by the present invention is as shown in FIG. 2. According to existing experiments and analysis, in recovery of a virtual container, low recovery speed of a data block is mainly caused by the need of multiple times of switching between the kernel state and the user state, and the communication efficiency of the kernel state and the user state is not high enough. Since the bottleneck lies in switching and communication between the kernel state and the user state, the effect of timely concurrent recovery may be limited.

In the present invention, all recovery operations are completed by the user state by virtue of the FUSE. Specifically, a FUSE file system is realized firstly, one of files therein is mapped to the /DEV/LOOP device, then the LOOP device is used as a shadow device of a disk (e.g. SDA) to be recovered, a virtual container loads the LOOP device to enable the virtual container, the access to the original hard disk is finally intercepted in the FUSE file system, and then the FUSE file system communicates with the backup server, so that on-demand recovery of data is realized.

Further, under the condition of on-demand data recovery, the above recovery process is essentially the same as a recovery process directly implemented in the kernel state, namely multiple times of switching between the kernel state and the user state is needed and network transmission needs to be waited. The FUSE essentially transmits the file system operation of the kernel state to a user state program for processing, returns the processing result to the kernel state and then transmits the processing result to an original application program. A benefit lies in that when non-on-demand recovery is performed, that is, when background aggressive recovery is performed without completely according to the current required data of a user, the switching between the kernel state and the user state is no longer needed, and the recovery may be completely realized in the user state. As long as one background thread is enabled, and data blocks transmitted from the server are continuously received and written back to the SDA device. Since the performance of the finally recovered system depends on the aggressive recovery mode to a great extent, the recovery performance may be greatly improved.

To better understand and apply the kernel state and user state data exchange method for disaster recovery of a virtual container system provided by the present invention, the following example will be specifically described in combination with FIG. 2, and the present invention is not limited to the following example.

Specifically, to make the purposes, technical schemes and advantages of the present invention clearer, the present invention will be further described in detail below through specific implementation. This implementation scheme takes the implementation based on an OPENVZ operating system virtualization technology and an FEDORA CORE 8 LINUX operating system as an example.

Firstly, the whole system is constructed in such a way that, a virtual container manager openvz is installed in each protected client and may load a physical disk as a local device for use, a FUSE file system is installed in the virtual container manager, a specified virtual file a is established in the FUSE file system, a virtual container maps the virtual file a to a /dev/loop device, then the loop device is used as a shadow device of a disk (e.g. sda) to be recovered, and the openvz enables the virtual container with the loop device. Then the access to the original hard disk is intercepted in the FUSE file system, and the FUSE file system performs data exchange with a remote backup server, so that a recovery process of data is completed.

During data recovery, the virtual container a adopts two recovery modes, namely an on demand mode and an aggressive mode. The former is applicable to the condition that needed data is not recovered in the process of loading the loop device when a local virtual container runs; and the latter is applicable to the condition that a local system copies a large batch of data in a remote backup center to quickly recover local data. The processing step flows of the FUSE under the two modes are as follows:

Step S1: on-demand recovery. Specifically, a file of the FUSE file system is mapped as /dev/loop0, then the openvz uses the device as /dev/sda, and the FUSE intercepts all read and write operations for the /dev/loop0.

Further, a bitmap is maintained, and the number of a data block which has been recovered and/or does not need to be recovered due to new write-in is recorded; then a bitmap_e is maintained, and information of an idle interval is recorded. Wherein read( ) if the data block is in the bitmap, it indicates that the data block has been recovered, and the data block contents are read from sda; if the data block is in the bitmap_e, it indicates that the data block is a free block, and random contents are returned, namely unallocated block; otherwise, the server is requested for the data block, and a reply is waited; the received data block contents are written to the corresponding position of the sda, and the bitmap is updated; and the data block contents are returned.

Further, write( ) the data block contents are written to the corresponding position of the sda, and the bitmap is updated; and if necessary, the server is notified that the data block does not need to be recovered.

Step S2: aggressive recovery of a server push form. Specifically, at the server, when an on-demand request is processed, the bitmap of the data block which has been recovered is recorded; if the client sends out a notification during write( ), the notification is also recorded in the bitmap; a background thread is enabled, all data blocks are scanned. The data blocks which are non-free blocks and are not in the bitmap are pushed to the client; for a free block interval, notify_empty is sent to the client; and the number of the pushed data block and the processed notify_empty are also recorded in the bitmap.

Further, at the client: a background thread is enabled, the data block pushed by the server is received, and whether the data block is in the bitmap of the client is checked; if the data block is in the bitmap, it indicates that the data block has been recovered in the on-demand mode or write( ) modification occurs, and the data block is ignored; if the data block is not in the bitmap, the data block is written to the corresponding position of the sda, and the bitmap is updated; and if notify_empty is recovered, the notify_empty is recorded in bitmap_e.

Step S3: leak finding. Specifically, after aggressive recovery is completed, the client checks the bitmap and the bitmap_e, and requests the server again if non-recovered data blocks are found.

The present invention discloses the kernel state and user state data exchange method for disaster recovery of a virtual container system, wherein in one disaster recovery backup of a virtual container, data needs to be exchanged between a kernel state and a user state. The file system operation of the kernel state needs to be transmitted to a user state program for processing firstly, and the processing result is returned to the kernel state and then transmitted to an original application program. In this process, low recovery speed of a data block is mainly caused by the need of multiple times of switching between the kernel state and the user state, and the communication efficiency of the kernel state and the user state is low. In the present invention, all recovery operations are completed by the user state by virtue of the FUSE. A FUSE file system is realized firstly, one of files therein is mapped to the /DEV/LOOP device, then the LOOP device is used as a shadow device of a disk (e.g. SDA) to be recovered, and a virtual container manager enables a virtual container with the LOOP device. The access to the original hard disk is intercepted in the FUSE file system, and then the FUSE file system communicates with the server, so that efficient data on-demand recovery is realized.

The embodiments above are merely used for describing the technical conception and characteristics of the present invention, and aim to enable those skilled in this art to understand the contents of the present invention and implement the present invention, rather than limiting the protection scope of the present invention. Equivalent alterations or modifications made according to the spiritual essence of the present invention shall fall into the protection scope of the present invention.

Although the embodiments of the present invention are described in combination with the accompanying drawings, various modifications and alterations may be made by those skilled in the art without departing from the spirit and scope of the present invention. These modifications and alterations shall fall into the scope defined by the appended claims.

The invention claimed is:

1. A kernel state and user state data exchange method for disaster recovery of a virtual container system, comprising:

establishing, by a virtual device mapping module, a FUSE user state file system, wherein the virtual device mapping module is included in a client to be recovered;

mapping a file in the FUSE user state file system to a DEV LOOP pseudo-device, wherein the DEV LOOP pseudo-device is used as a shadow device of a disk to be recovered according to a preset recovery mode;

maintaining, by a missing page detecting module, a recovery data bitmap, and recording a number of data blocks which has been recovered and/or does not need to be recovered due to new write-in, wherein the missing page detecting module is included in the client to be recovered;

maintaining, by an available page maintaining module, an available data bitmap based on the maintaining of the recovery data bitmap, and recording information of an idle page interval, wherein the available page maintaining module is included in the client to be recovered; and performing, by a data transmission module, transmission exchange of final information data, wherein the data transmission module is included in the client to be recovered.

2. The method of claim 1, wherein the missing page detecting module is further configured to monitor whether a recovered data page exists.

3. The method of claim 1, wherein the preset recovery mode comprises an on-demand recovery mode and an aggressive recovery mode;

wherein the on-demand recovery mode indicates that a system to be recovered runs through a virtual container under the condition that data is not in position and initiates a data recovery request as required for the data needed in running of the virtual container; and the aggressive recovery mode indicates that an unused data block also pre-fetches advanced data in the running process of the system to be recovered.

4. The method of claim 3, wherein the client to be recovered recovers data through the on-demand recovery mode:

for a read operation, if the data is in a position indicated by the recovery data bitmap, judging that the data has been recovered, and directly reading the data block contents from the SDA;

if the data is in the available data bitmap, judging that no data block is used, and returning random contents to recover the data; and if the above two conditions are not involved, requesting a server for the data block, waiting for a data reply, writing the received data block contents to the corresponding position of the SDA, updating the recovery data bitmap, and returning the data block contents.

5. The method of claim 3, wherein the data write flow of aggressive recovery implemented through the aggressive recovery mode, at the backup server, comprises:

for a write operation, enabling a background thread, scanning all data blocks, judging that the data block is a non-idle data block and is not in the recovery data bitmap, and pushing the data to the client; and for an idle block interval, sending an idle notification message to the client, wherein a number of pushed data blocks and the processed idle notification message are recorded in the recovery data bitmap.

6. The method of claim 3, wherein the data write flow of aggressive recovery implemented through the aggressive recovery mode, at the client to be recovered, comprises:

enabling a background thread, receiving the data block pushed by the server, and checking whether the data block is in the recovery data bitmap of the client;

if the data block is in the recovery data bitmap, judging that the data has been recovered as required or data write modification occurs, and ignoring;

if the data block is not in the recovery data bitmap, writing the data block to the corresponding position of the SDA, and updating the bitmap; and if the idle notification message is received, recording the idle notification message in an idle data bitmap.

7. The method of claim 6, further comprising a leak finding process, wherein after the aggressive recovery is completed, the client checks the data recovery bitmap and the idle data bitmap, requests the server to recover the data if a non-recovered data block is found, and modifies the corresponding bitmap.

8. The method of claim 1, wherein mapping a file in the FUSE user state file system to a DEV LOOP pseudo-device, wherein the DEV LOOP pseudo-device is used as a shadow device of a disk to be recovered according to a preset recovery mode comprises:

mapping the file of the FUSE file system as /DEV/LOOP0; and using, by the virtual container system, the above device as /DEV/SDA, and intercepting, by a FUSE, all read and write operations on the /DEV/LOOP0.

* * * * *